H. RICHARDSON.
ELECTRIC SCALE.
APPLICATION FILED NOV. 27, 1909.
1,066,656.
Patented July 8, 1913.
3 SHEETS—SHEET 1.
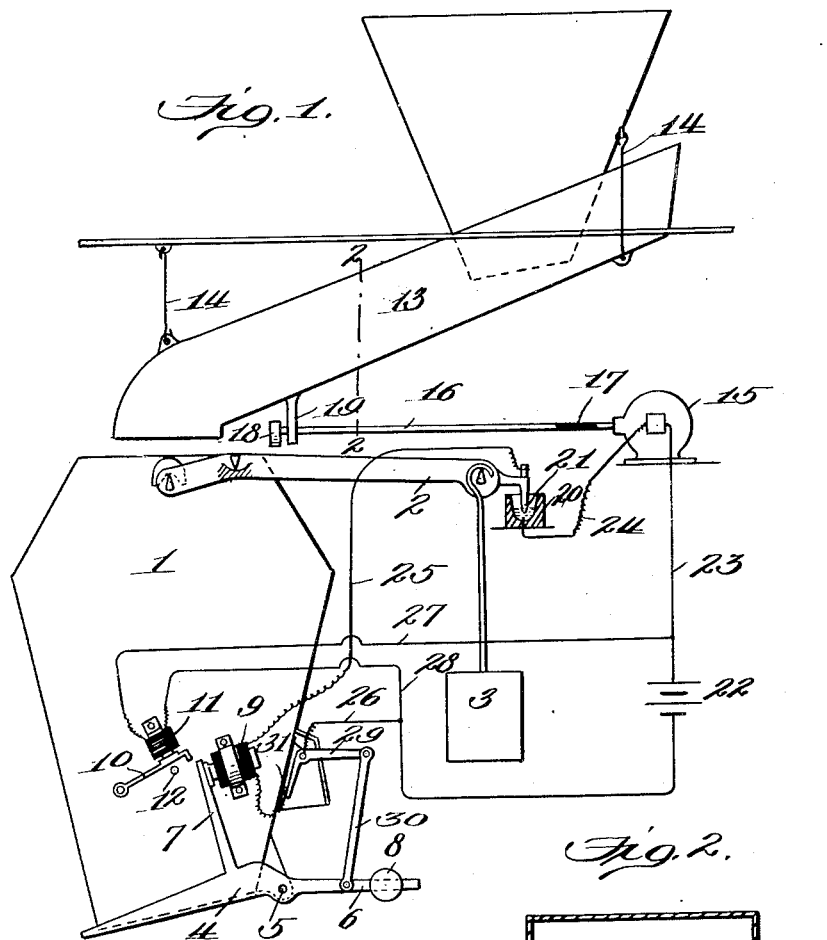
Fig. 1.
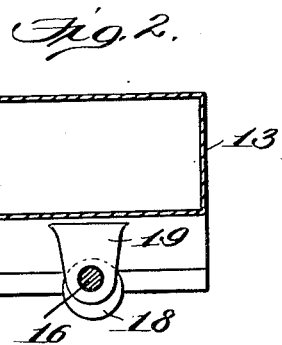
Fig. 2.
Fig. 3.
Witnesses,
Inventor
Henry Richardson
By James L. Norris
Atty.

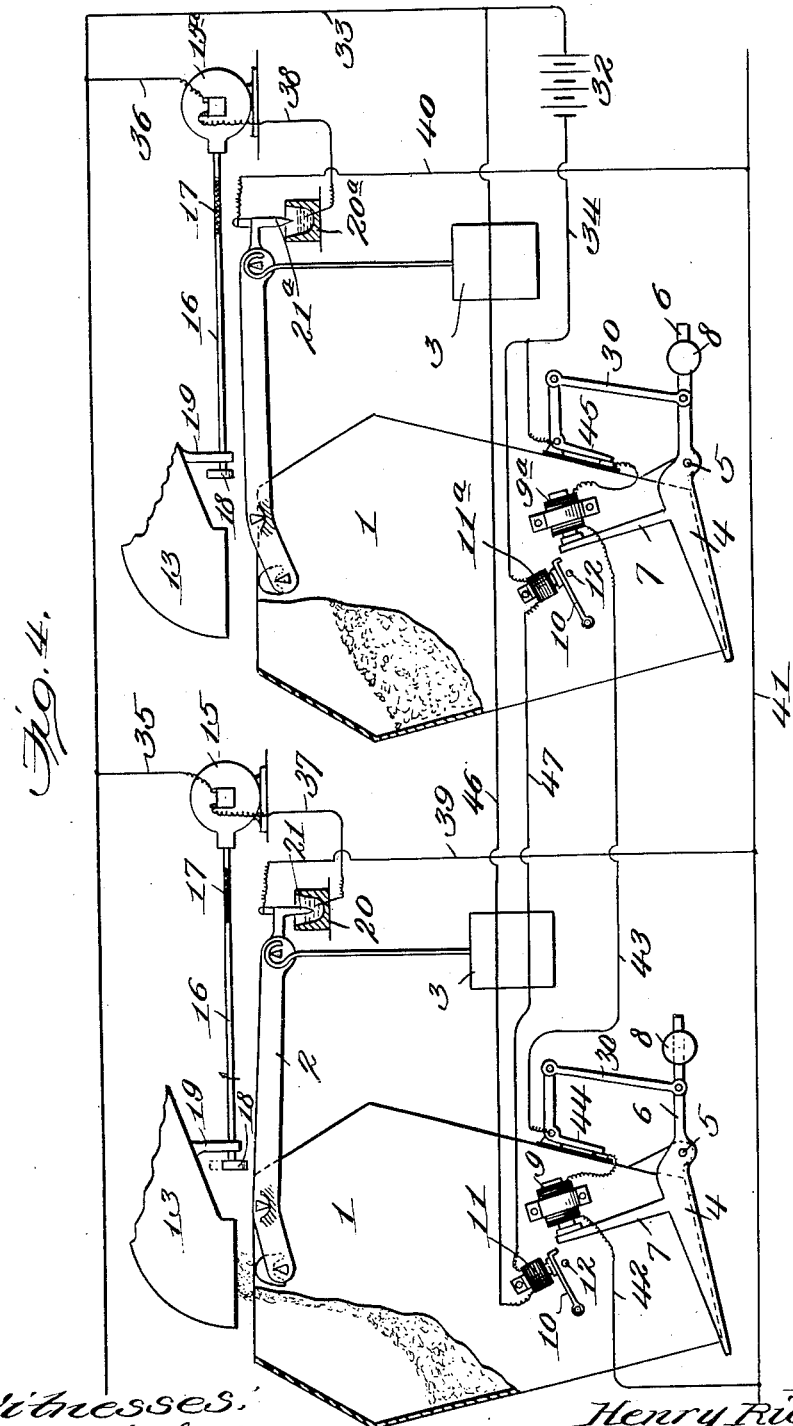

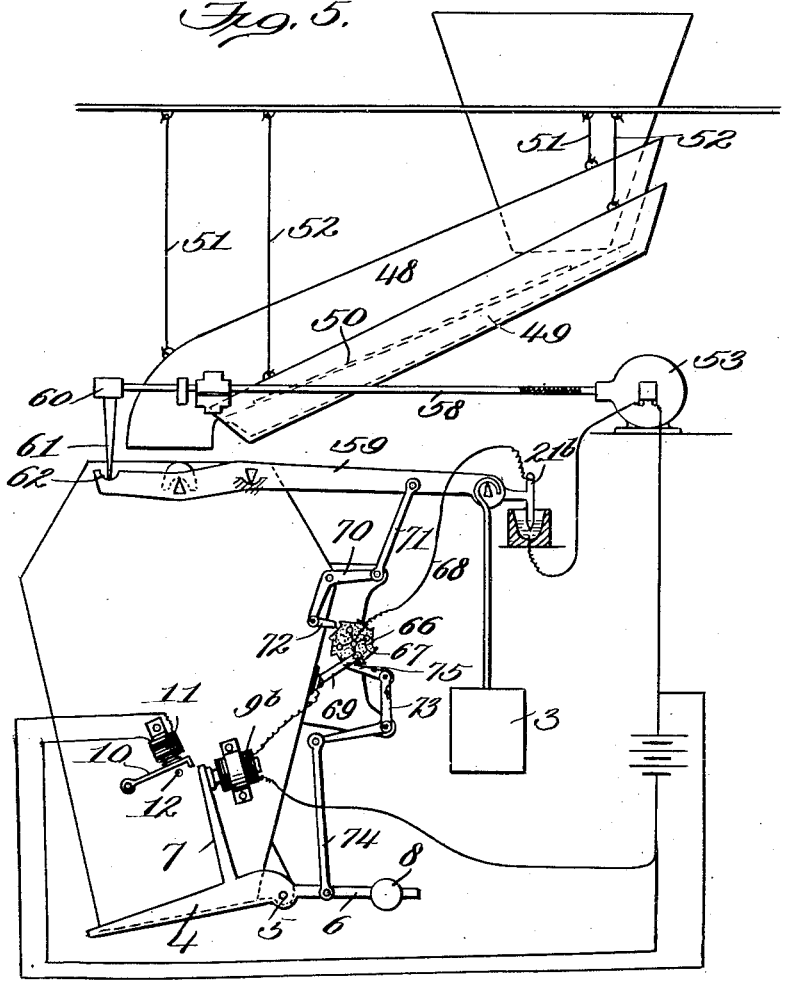
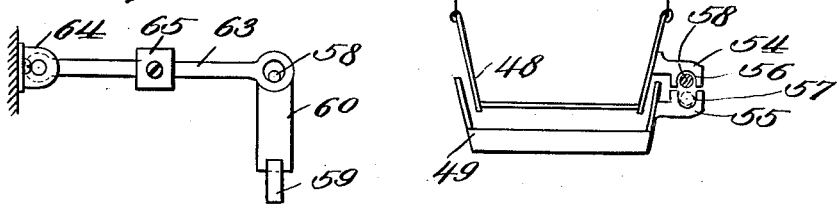

UNITED STATES PATENT OFFICE.

HENRY RICHARDSON, OF PASSAIC, NEW JERSEY.

ELECTRIC SCALE.

1,066,656.

Specification of Letters Patent.

Patented July 8, 1913.

Application filed November 27, 1909. Serial No. 530,237.

*To all whom it may concern:*

Be it known, that I, HENRY RICHARDSON, a subject of the King of Great Britain, residing at Passaic, in the county of Passaic and State of New Jersey, have invented certain new and useful Improvements in Electric Scales, of which the following is a specification.

My present invention relates to improvements in weighing machines, and it has for its object primarily to provide means, preferably electro-magnetic, for controlling the operation of the feeding and discharging devices for the weigh hopper whereby said devices are mutually dependent upon one another and both of said devices are dependent upon the weigh hopper, the feed of material to the weigh hopper being interrupted and the weighed material therein being discharged automatically upon the settling or poising of the weigh beam, the feeding device being held from operation until the discharge door of the weigh hopper has been closed.
Another object of the invention is to provide full-flow and dribble feed devices which are successively or alternately rendered operative by the movement of the weigh beam, both of said feeds being preferably operated from a single shaft or equivalent device which is shifted automatically from one feed device to the other as the weigh beam descends or rises.

Further objects of the invention are to provide a switch whereby the feeding and discharging devices are rendered mutually dependent for operation one upon the other and also a safety device for preventing premature discharge of the contents of the weigh hopper should the current supply for the controlling circuit fail.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a diagrammatic view of a weighing machine equipped with controlling means for the feeding and discharging devices; Fig. 2 represents a transverse section through the feed chute and vibratory shaft, the section being represented by the line 2—2 of Fig. 1; Fig. 3 is a detail perspective view of a portion of the vibratory shaft; Fig. 4 is a diagrammatic view showing a plurality of weighing machines connected by a controlling circuit whereby simultaneous discharge of all the machines may be effected; Fig. 5 is a diagrammatic view of a weighing machine provided with controlling means for the feeding and discharging devices, the weighing machine being equipped with full-flow and dribble feeding mechanism which are alternately operative and are controlled automatically by the settling of the weigh hopper; Fig. 6 is a detail view of the member which controls the change from full-flow to dribble feed, and vice versa; and Fig. 7 represents an end view of the double feed chutes.

Similar parts are designated by the same reference characters in the several views.

In the accompanying drawing, I have shown certain embodiments of my invention as applied to a weighing machine of one particular type. It will be understood, however, that the invention is not necessarily limited in its application to weighing machines of the particular type shown, nor is the invention limited to the specific construction and arrangement of the elements and the connections that control the operation of the feeding and load discharging devices, as certain modifications and changes may be made in the detail construction thereof in order that the invention may be applied to the best advantages according to the circumstances and requirements of each particular case.

In the present instance, 1 designates generally the weigh hopper supported by a weigh beam 2 and the latter in turn is provided with a suitable counterpoise 3. The weigh hopper is provided with a door or other appropriate closure which is closed during the weighing operation and is opened after the weighing has been completed in order to discharge the weighed contents of the weigh hopper. A door 4 is shown in the present instance which is pivoted at 5 and is provided with two arms 6 and 7, the arm 6 carrying a counterweight 8 which serves to close the door after the contents have been discharged from the hopper. The arm 7 is rigidly attached to and movable with the door 4 and provides an armature for an electro-magnetic device which controls the opening of the door. This electro-magnetic door retaining device in the present instance is shown as a magnet or solenoid 9 which may be secured to the adjacent side of the hopper and when the door is in closed position, the armature upon the arm 7 will be in coöperative relation with the magnet so that while this magnet is energized, the door will be held in closed position and when the magnet is deënergized by an interruption, the door may open. If so desired, a safety device may be provided for preventing premature opening of the door due to a failure of current. In the present instance, I have shown a detent 10 which is pivoted to the side of the hopper and has its free end arranged adjacent to the arm 7. This detent also provides an armature for a magnet or solenoid 11, the latter being connected in the main line circuit so that under normal conditions the detent 10 will be attracted by its magnet and thereby held clear of the arm 7. A projection 12 is shown which may serve to position the detent so as to lock the arm 7 immediately upon an interruption or failure of the current.

The material is fed to the weigh hopper through a chute 13 which is preferably inclined downwardly toward the weigh hopper and is so supported that it may be vibrated in order to effect a flow of material therethrough during the filling of the weigh hopper, and its inclination with respect to the character of the material being handled is preferably such that while the chute is at rest the flow of material therein will cease. Any suitable means may be provided for supporting the chute to permit vibration thereof. In the present instance, the chute is shown hung by links 14. According to the present invention, I provide a feeding device which will be held from operation while the hopper door is open and in the present instance, it embodies an electric motor 15 which is operatively connected to a vibratory shaft 16, the latter being preferably connected to the motor shaft by a flexible connection 17 and equipped at its free end with an eccentric or equivalent device 18 the center of gravity of which is eccentric to the geometrical axis of the shaft whereby rotation of the shaft at a relatively high speed will cause the shaft to vibrate at high frequency. The shaft 16 is connected to the feed chute through the medium of a bearing 19 and the vibratory shaft acts upon this bearing to impart to the feed chute vibratory movements of a degree sufficient to produce a flow of material through the chute and into the weigh hopper while the motor is operating.

In order to automatically interrupt the feed of material to the weigh hopper and to open the door of the weigh hopper and discharge its contents when the weigh hopper has received a properly weighed charge of material, I connect the electric motor for the feed device and the magnet or solenoid for the hopper door in series and interpose in such circuit a circuit-controlling device which is operated by the weigh beam. Different forms of electric switches may be used for this purpose. In order, however, to avoid any inaccuracy in the weighing operation, I preferably provide a mercury contact switch which will not offer any material resistance to the movement of the weigh beam. The mercury switch shown in the present instance consists of a mercury containing cup 20 and a contact 21, the contact being preferably carried by the weigh beam and when the weigh hopper descends, the circuit through the mercury switch will be broken, thereby causing interruption in the operation of the motor for the feed device and deënergizing of the magnet which holds the hopper door in closed position. As an example of a circuit for connecting the electrical controlling mechanism, 22 may represent the source of current supply. A wire 23 leads from one pole of the source to one terminal of the motor, a wire 24 leads from the other terminal of the motor to the mercury containing cup 20, a wire 25 leads from the contact 21 on the weigh beam to one terminal of the magnet or solenoid 9, and a return wire 26 leads from the other terminal of the magnet or solenoid 9 to the source of current supply. The magnet or solenoid 11 for preventing premature opening of the hopper door in case of failure in the current supply is not controlled by the mercury switch of the weigh beam but is connected by the wires 27 and 28 directly to the main wires which supply current to the machine.

In order to prevent the motor from starting before the hopper door has been completely closed, I preferably interpose a switch in circuit with the motor and the door retaining magnet which switch will be opened upon the opening of the hopper door and will be closed by the closing of the hopper door. As an example of a switch of this character, I have shown one involving a bell-crank 29 one arm of which is connected to the arm 6 of the hopper door by a link 30 while its opposite arm is arranged to coöperate with a contact 31.

The operation of the weighing machine and its controlling mechanism is as follows: Assuming that the weigh hopper 1 is in filling position, the end of the weigh beam carrying the counterweight will be down, the contact 21 being immersed in the mercury contained in the cup 20. A circuit will then be complete, starting with the source of supply 22 and passing through the conductor 23 to the motor, thence from the motor through the wire 24 to the mercury switch, passing from the mercury switch by the wire 25 to the magnet or solenoid 9 and from the magnet or solenoid 9 through the conductor 26, through the interposed switch member 29 and contact 31 back to the source of supply. When the controlling circuit is in this condition, the magnet or solenoid 9 will be energized and will thereby retain the discharge door of the hopper in closed position and the motor 15 will operate to feed material through the chute 13 and into the weigh hopper. When, however, a sufficient charge of material has been introduced into the weigh hopper to cause the latter to descend or to poise the weigh beam, that end of the latter carrying the contact 21 will rise, this contact leaving the mercury in the cup 20 and thereby breaking the circuit both for the motor and for the magnet or solenoid. The motor will immediately stop thereby discontinuing the feed of material to the weigh hopper and the deënergizing of the magnet or solenoid 9 will permit the hopper door to open and discharge the contents thereof. The opening movement of the hopper door will operate through the link 30 to also open the motor and magnet circuit through the switch member 29 and contact 31 and owing to the breaking of the circuit by this switch which is controlled by the hopper door, the motor cannot again operate until after the hopper door has been completely closed, thereby avoiding waste of material. After a certain amount of material has discharged from the weigh hopper, that end of the weigh beam carrying the contact 21 will again descend so as to again establish the circuit through the mercury switch but, as before stated, the circuit for the motor and the hopper door retaining magnet is not closed until the hopper door has been completely closed whereupon the circuit is established through the motor and the hopper retaining door to hold said door in closed position and to renew the feeding operation through the chute 13 owing to the running of the motor. As the magnet 11 which controls the safety detent is connected directly to the source of current supply, this magnet will remain energized to hold the detent in an inoperative position until the source of current supply fails whereupon it will release the detent and the latter will lock the hopper door from opening until the source of current supply is reëstablished, the detent being then automatically retracted so that the weighing machine may resume its operation.

In some cases, it may be desirable or necessary that a plurality of weighing machines should be so controlled that they may operate to simultaneously discharge their loads, that is, an equal number of loads is discharged with certainty from each weighing machine of the series. In Fig. 4, I have shown as an example, a plurality of weighing machines of the same type disclosed in Fig. 1, and these weighing machines are electrically controlled so as to effect simultaneous discharge thereof, notwithstanding the fact that one weighing machine may complete its weighing operation before one or more remaining machines of the series is ready to discharge. In the instance shown, 32 represents diagrammatically a source of current supply which is connected to the main line wires 33 and 34, one of these wires (the wire 33 in the present instance) extending from one machine to the other or others, and the motors 15 and 15$^a$ are connected in parallel with the conductor 33 by the wires 35 and 36, the motors 15 and 15$^a$ being connected to the respective mercury cups 20 and 20$^a$ by the wires 37 and 38, and the contacts 21 and 21$^a$ upon the respective weigh beams being connected in parallel by the wires 39 and 40 to a common conductor 41. Any number of machines may be connected in the circuit through the medium of the conductors 33 and 41 which are common to all of the machines. One of the weighing machines, preferably the last one in the series, has its door retaining magnet 9 connected to the conductor 41 through the wire 42, the other terminal of this magnet being connected by the wire 43 and the circuit breaking switch 44 to the corresponding door retaining magnet 9$^a$ of the next weighing machine of the series, the other terminal of this magnet 9$^a$ being connected through the circuit breaking switch 45 to the conductor 34 which is connected directly to the source of current supply. The magnets or solenoids 11 and 11$^a$ for the retaining detents are connected by the wires 46 and 47 directly to the main current supply wires 33 and 34. During the weighing operation, the motors of the different weighing machines will operate until each weigh hopper has received a properly weighed charge of material and the doors of the weigh hoppers during the weighing operation will be held in closed position, the circuit starting for instance from the main conductor 33 and dividing so that a portion flows through the motor 15 of one machine and the motor 15$^a$ of another machine through the wires 35 and 36 respectively. During the weighing operation, those ends of the weigh beams carrying the contacts 21 and 21$^a$ will be in depressed position, the motor circuit being thereby completed through the mercury switches and the common conductor 41 serves to conduct the current in series through the hopper door retaining magnets 9 and 9ª, the circuit being completed with the source of supply from the magnet 9ª through the circuit breaking switch 45. When, however, one of the machines has completed its weighing operation, its hopper will descend, bringing the parts into the position shown at the right hand side of Fig. 4. The descent of the weigh hopper upon receiving a charge of material causes the contact 21ª to break the motor circuit for this particular machine, the wires 38 and 40 which contain the motor and mercury switch for this machine being thereby disconnected. Assuming, however, that the machine at the left hand side of Fig. 4 has been delayed in completing its weighing operation, it will be seen that the weigh hopper of this machine is still in elevated position and the circuit is still maintained through its motor 15 so that the feed of material may continue until the weigh hopper has received a full charge. Although at this moment, the motor circuit for the right hand machine has been broken, this right hand machine is still held from discharging for the reason that the current still flows through the wire 35, the motor 15, the wire 37, the mercury switch for the left hand machine, the wire 39, the common conductor 41, the conductor 42, the magnet 9 for the left hand machine, conductor 43, the magnet 9ª for the right hand machine, and through the switch 45 back to the source of supply. The moment, however, that the machine at the left has received a full charge, the settling of the weigh hopper thereof will break the circuit between the contact 21 on the weigh beam thereof and the mercury containing cup which operation will not only stop the motor 15 but will break the only remaining circuit through the hopper door retaining magnets 9 and 9ª for all of the machines of the series whereupon a simultaneous discharge of a plurality of machines is effected. The circuits are reëstablished by the respective machines after dumping their contents in a manner similar to that described in connection with the single machine shown in Fig. 1.

The present invention also provides an automatic weighing machine having a double feed, that is, a full-flow feed for supplying the bulk of material to the weigh hopper and a dribble feed for completing the charge whereby the machine may reach a poise and in Fig. 5, I have shown an example of such a machine which also embodies the mutual control between the feeding devices and the discharging means as well as a switch for effectually preventing operation of the motor for the feed devices until after the hopper door has opened and closed. In the present instance, the feed mechanism comprises a main feed chute 48 and an auxiliary or dribble feed chute 49, the main feed chute being preferably mounted above the auxiliary or dribble feed chute and has a grid 50 for controlling the flow of material therethrough. These two feed chutes are preferably suspended or supported for independent vibration, pairs of links or their equivalents 51 and 52 being shown for this purpose in the present instance. According to the present invention, a single motor 53 is used and means is provided whereby this motor may alternately vibrate the respective chutes whereby a full-flow of material may first take place and after the weigh hopper has descended a predetermined distance, the main flow will be interrupted and the dribble flow will start automatically. In the present instance, the full-flow and dribble feed chutes are provided with bearings 54 and 55 which are preferably rigidly attached to the respective chutes and have opposed seats 56 and 57, the vibratory shaft 58 operated by the motor being capable of shifting from one bearing seat to the other due to a change in elevation of the shaft. In the present instance, the shaft 58 is shifted automatically from one chute to the other by a connection between it and the weigh beam 59, a bearing 60 in the present instance coöperating with the shaft 58 and having a knife-edge 61 which rests preferably in a depression 62 formed in that end of the weigh beam which supports the weigh hopper. This bearing 60 may be steadied if desired by means of a lateral arm 63 thereon which is pivotally attached to a stationary part of the machine frame by the bracket 64 and if desired a regulating weight 65 may be mounted to slide adjustably on this arm 63. The pressure of the shaft 58 upon the weigh beam at the point of engagement between the knife-edge 61 and the bearing 62 determines the length of the dribble feed, and the weight 65 may be used to vary the effective pressure of this vibratory shaft on the weigh beam and thereby insure a dribble of the proper duration to allow the beam to make its first movement. While the weigh hopper is in filling position, that end of the weigh beam which supports the hopper will be elevated and the bearing 60 will act upon the vibratory shaft 58 so as to position it within the seat 56 of the bearing 54 which is attached to the main feed chute 48. The operation of the motor will then produce a full-flow of material into the weigh hopper. When the latter, however, has received approximately a full load it will begin to descend, and the edge 61 of the bearing 60 being supported by the weigh beam, this bearing will also descend and will allow the vibratory shaft 58 to leave the seat 56 in the bearing 54 on the main feed chute and to enter the seat 57 in the bearing 55 on the lower or dribble feed chute, the main feed being thereby interrupted and the weighing operation being completed by the dribble feed. Upon the discharge of the contents of the weigh hopper, the vibratory shaft 58 will return automatically to a position to again operate the main feed chute.

In Fig. 5, I have also shown a switch for automatically breaking the circuit through the feed operating motor and through the hopper door retaining magnet upon the descent of the weigh beam and for automatically reëstablishing the circuit through these elements upon the return of the weigh beam to "no-load" position and the closing of the hopper door. In the instance shown, this switch comprises a rotatable toothed disk or drum 66 having a suitable number of contacts 67 thereon which are connected in common to the contact 21$^b$ of the mercury switch by a conductor 68. A stationary brush 69 is arranged to successively close and open the circuit through the contacts 67 at each step in the movement of the rotary switch, the brush 69 being connected to the hopper door retaining magnet 9$^b$. The purpose is to rotate the disk 66 one step so as to break the circuit for the motor and door retaining magnet when the hopper descends, and to rotate the part 66 to reëstablish such circuit by the closing of the hopper door. In the present instance, I have shown an example of means for accomplishing this result, a bell-crank 70 being connected to the weigh beam by a link 71 and carrying a pawl 72 which operates successively upon the teeth of the rotatable disk 66, and a second bell-crank 73 being connected to the hopper door by a link 74 and carrying a pawl 75 which also acts upon the teeth of the disk 66. During the weighing operation, the disk 66 occupies such a position that the brush 69 will rest upon one of its contacts 67. Upon the descent of the weigh hopper, however, the bell-crank 70 will be turned by reason of its connection to the weigh beam by the link 71, the pawl 72 acting upon the disk 66 to rotate it one step which will carry the disk into such a position that the brush 69 rests between two adjacent contacts thereon. While the disk occupies this position, the motor cannot operate nor can the door be held in open position and consequently, the feed is interrupted with certainty and a positive discharge of the contents of the weigh hopper is effected. After the contents of the weigh hopper have been completely discharged, however, the door thereof in swinging into closed position will operate through the link 74, bell-crank 73 and the pawl 75 to rotate the disk 66 another step which will bring one of the contacts 67 on the disk into engagement with the brush 69 whereupon the circuit through the operating motor for the feed and the magnet for retaining the hopper door in closed position is again established.

I claim as my invention:

1. In a weighing machine, the combination of a weigh hopper provided with a discharge door, an electro-magnetically controlled feed device therefor, electro-magnetic means for retaining said discharge door in closed position when energized, and an electric circuit having said electro-magnetically controlled feed device and electromagnet connected in series therein.

2. In a weighing machine, the combination of a movably mounted weigh hopper provided with a discharge door, an electromagnetically operated feed device therefor, an electro-magnetic retaining device for preventing opening of the discharge door when energized, and an electric circuit connecting said electro-magnetically operated feed device and electro-magnetic retaining device and controlled by the movement of the weigh hopper.

3. In a weighing machine, the combination of a feeding device, an electric motor for operating it, a weigh hopper provided with a discharge door, an electro-magnet for holding said discharge door in closed position when energized, an electric circuit having said motor and electro-magnet connected in series therein, and means operative upon the completion of the weighing operation for breaking said circuit and thereby interrupting the operation of the feeding device and deënergizing said electro-magnet to permit opening movement of said discharge door.

4. In a weighing machine, the combination of a weigh hopper, a device for feeding material thereto, an electric motor for operating said feed device when such motor is running, a load discharging device for the weigh hopper, an electro-magnetic device operative to hold said load discharging device in non-discharging position when energized, and an electric circuit including said motor and electro-magnetic device in series therein and having means for breaking it upon the settling of the weigh hopper for interrupting the feed and causing the discharge of a load from the weigh hopper by a deënergizing of said electro-magnetic device.

5. In a weighing machine, the combination of an electro-magnetically operated feeding device, a weigh hopper provided with a discharge door, electro-magnetic means for holding said discharge door in closed position when energized, and a controlling circuit having means for breaking it to interrupt the operation of the electromagnetically operated feeding device and for deënergizing said electro-magnetic means for the load discharge door, said circuit also having means for preventing operation of the feeding device while the discharge door is in load-discharging position.

6. In a weighing machine, the combination of a weigh hopper provided with a discharge door, a feeding device for supplying material to the weigh hopper, an electric motor for operating the feeding device when such motor is running, electro-magnetic means operative to hold the discharge door of the weigh hopper in closed position when energized, and an electric circuit having said motor and electro-magnetic means connected in series therein, said circuit including a circuit controller for opening such circuit automatically upon the completion of a load and also including a switch which automatically opens and closes said circuit upon the opening and closing of the discharge door.

7. In a weighing machine, the combination of a weigh hopper, an electric motor operated feeding device, a discharging device having electro-magnetic means for holding it in closed position when energized, and a circuit including said electric motor operated feeding device and said electro-magnetic means in series therein and also including a circuit controller whereby said devices are mutually controlled.

8. In a weighing machine, the combination of a weigh hopper, a feed device having electro-magnetic means for operating it, a discharge door for the weigh hopper, an electro-magnet for holding said door in closed position when energized, a circuit connecting the electro-magnetic operating means for the feed device and electro-magnet in series therein, a circuit controller connected in said circuit and operative upon the settling of the weigh hopper to automatically break such circuit to interrupt the feed and deënergize said electro-magnet to permit opening movement of the discharge door, and a switch also connected in said circuit and operative to open and close said circuit upon the opening and closing of the discharge door whereby the feed device and discharge door are mutually controlled in their operations.

9. In a weighing machine, the combination of a weigh hopper, a discharge door therefor, a feed device for supplying material to the weigh hopper, an electric motor for operating the feed device, an electro-magnetic device coöperative with a part of said door for retaining the latter in closed position while said device is energized and for releasing said door to permit its opening when said device is deënergized, and an electric circuit having the motor for said feed device and said electro-magnetic device connected in series therein.

10. In a weighing machine, the combination of a weigh hopper, an electro-magnetically operated feed device, a discharge door for the weigh hopper, electro-magnetic means for retaining said door in closed position when energized, a controlling circuit including the feed device and electro-magnetic retaining means for the hopper door, and means for interrupting said circuit after the weigh hopper has received a properly weighed quantity of material whereby the feed is interrupted and the hopper door is permitted to open.

11. In a weighing machine, the combination of a weigh hopper having a discharge door, an electro-magnetically operated feed device, an electro-magnetic device for holding the hopper door in closed position when energized, a circuit including the operating means for the feed device and holding means for the hopper door, and a circuit breaker operative by the settling movement of the weigh hopper for breaking said circuit and effecting simultaneous interruption in the feed and opening movement of the hopper door.

12. In a weighing machine, the combination of a weigh hopper, a discharge door thereof, an electro-magnetically operated feed device, electro-magnetic means for holding the hopper door in closed position when energized, a circuit including the operating means for the feed device and the electro-magnetic means for the hopper door, and a circuit controller connected in said circuit and having means for operating it to break said circuit upon the settling of the weigh hopper and for closing said circuit upon the closing of the hopper door.

13. In a weighing machine, the combination of a weigh hopper having a discharge door, electro-magnetic means coöperative with a part of said door to retain the latter in closed position when energized, and a locking detent and coöperating magnet, the latter when energized holding the detent in inoperative position and when deënergized permitting the detent to lock the door from opening.

14. The combination of a plurality of weighing machines, each having a feeding device, and a load discharging device, an electric motor for operating the feed device for each weighing machine, electro-magnetic means for controlling the operation of the load discharging device of each machine, an electric circuit having the motors of said machines connected in parallel therein and having the electro-magnetic means for the load discharging devices connected in series therein, and a circuit breaker for the motor of each machine, the circuit breaker being opened when each machine is in discharging condition whereby each machine may individually perform its weighing operation and the discharge of the machines be simultaneous.

15. In a weighing machine, feed mechanism including a feed chute for supplying material to a weigh hopper the chute sloping downwardly toward its discharge end and capable of vibration, and a vibratory shaft bearing upon said chute and adapted to vibrate the chute while said shaft is in operation.

16. In a weighing machine, feed mechanism including a sloping chute for supplying material to a weigh hopper, said chute being mounted for vibratory movement, a shaft capable of vibration and having a bearing on said vibratory chute, and means for imparting vibratory movement to said shaft while the same revolves.

17. In a weighing machine, feed mechanism including a sloping chute mounted for vibratory movement and capable of causing a flow of material therethrough while vibrating and of interrupting said flow while at rest, and a vibratory shaft coöperative with the chute for vibrating the latter.

18. In a weighing machine, the combination of a sloping feed chute mounted for vibratory movement, and means for vibrating said chute to promote the flow of material therethrough embodying a shaft having a bearing on the chute and provided with an eccentric weight or body.

19. In a weighing machine, the combination of a sloping feed chute mounted for vibratory movement to promote the flow of material therethrough, a motor, a vibratory shaft having a bearing on said chute, and a flexible connection between the vibratory shaft and the motor shaft.

20. In a weighing machine, feed mechanism comprising main and dribble chutes, a weigh hopper arranged to receive material from said chutes, and means governed by the settling of the weigh hopper for successively vibrating the main and dribble feed chutes.

21. In a weighing machine, feed mechanism comprising main and dribble feed chutes both mounted for independent vibratory movement, a weigh hopper to receive material from both chutes, a vibratory shaft adapted to have a bearing upon one or another of said chutes for vibrating them, and means controlled by the settling of the weigh hopper for causing said shaft to successively operate upon the main and dribble feed chutes.

22. In a weighing machine, the combination of a weigh hopper, main and dribble feed chutes mounted for independent vibratory movement and having opposed bearings thereon, a vibratory shaft, and means controlled by the movement of the weigh hopper for causing said shaft to operate first upon the main feed chute and subsequently upon the dribble feed chute.

In testimony whereof I have hereunto set my hand in presence of two subscribing witnesses.

HENRY RICHARDSON.

Witnesses:
   SAUL E. SCHER,
   CHARLES SLAFF.